(12) United States Patent
Schneider et al.

(10) Patent No.: US 7,697,408 B2
(45) Date of Patent: Apr. 13, 2010

(54) DATA COMMUNICATION SYSTEM AND METHOD CAPABLE OF LIMITING EFFECTS OF CROSSTALK BY ADJUSTING TRANSCEIVER POWER LEVELS

(75) Inventors: Kevin W. Schneider, Huntsville, AL (US); Richard L. Goodson, Huntsville, AL (US); Arlynn W. Wilson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 1426 days.

(21) Appl. No.: 10/646,009

(22) Filed: Aug. 22, 2003

(65) Prior Publication Data

US 2004/0114503 A1 Jun. 17, 2004

Related U.S. Application Data

(60) Provisional application No. 60/433,489, filed on Dec. 13, 2002.

(51) Int. Cl.
*H04J 15/00* (2006.01)

(52) U.S. Cl. ............ 370/201; 370/252; 370/254; 370/286; 379/406.01

(58) Field of Classification Search ............ 370/201; 379/338–418
See application file for complete search history.

(56) References Cited

U.S. PATENT DOCUMENTS

| | | | |
|---|---|---|---|
| 6,208,670 B1 * | 3/2001 | Milliron et al. | 370/540 |
| 6,236,726 B1 * | 5/2001 | Darveau | 379/417 |
| 6,246,716 B1 | 6/2001 | Schneider | |
| 6,339,613 B2 * | 1/2002 | Terry | 375/227 |
| 6,393,052 B2 | 5/2002 | Sadjadpour et al. | |
| 6,480,487 B1 | 11/2002 | Wegleitner et al. | |
| 6,532,277 B2 * | 3/2003 | Ulanskas et al. | 379/27.01 |
| 6,625,262 B2 * | 9/2003 | Starr | 379/93.08 |
| 6,748,016 B1 * | 6/2004 | Tzannes | 375/227 |
| 7,181,142 B1 * | 2/2007 | Xu et al. | 398/66 |
| 7,266,154 B2 * | 9/2007 | Gundrum | 375/258 |
| 7,272,215 B2 * | 9/2007 | Bremer et al. | 379/93.09 |
| 2002/0105964 A1 * | 8/2002 | Sommer et al. | 370/463 |
| 2003/0086514 A1 * | 5/2003 | Ginis et al. | 375/346 |
| 2003/0185385 A1 * | 10/2003 | Boudreaux et al. | 379/387.01 |
| 2004/0096052 A1 * | 5/2004 | Liu | 379/399.01 |
| 2004/0114751 A1 * | 6/2004 | Tomilson | 379/399.01 |

OTHER PUBLICATIONS

Committee T1-Telecommunications, *Spectrally Compatible RT-Based ADSL*, T 1 E1.4/2000-321, pp. 1-8 (2000).
NRIC V Focus Group 3, *Remote Deployments of DSL: Advantages, Challenges, and Solutions*, NRIC, pp. 3-28, Dec. 14, 2001.

* cited by examiner

Primary Examiner—William Trost, IV
Assistant Examiner—Roberta A Shand
(74) Attorney, Agent, or Firm—Lanier Ford Shaver & Payne, P.C.; Jon E. Holland

(57) ABSTRACT

A system for adjusting transmission power levels of transceivers in order to reduce crosstalk utilizes a transmitter and logic. The transmitter is configured to transmit signals to a customer transceiver over a first communication connection that is bound within a binder. The logic is configured to estimate a distance of a data path between the transmitter and the customer transceiver based on at least one signal communicated over the data path. The logic is further configured to adjust a transmission power level of the transmitter based on the estimated distance such that signals transmitted by the transmitter to the customer transceiver are spectrally compatible with signals transmitted from another transceiver over a second communication connection that is bound within the binder.

31 Claims, 16 Drawing Sheets

| | | | A = 0 ft. |
| | | | A = 500 ft. |
| | | | A = 1000 ft. |

| Entry No. | B (ft.) | B + C (ft.) | Power Back-off (dB) |
|---|---|---|---|
| 1. | 500 | 3000 | value $a'$ |
| 2. | 500 | 4000 | value $b'$ |
| 3. | 500 | 5000 | value $c'$ |
| 4. | 500 | 6000 | value $d'$ |
| 5. | 500 | 7000 | value $e'$ |
| 6. | 500 | 8000 | value $f'$ |
| 7. | 1000 | 3000 | value $g'$ |
| 8. | 1000 | 4000 | value $h'$ |
| 9. | 1000 | 5000 | value $i'$ |
| 10. | 1000 | 6000 | value $j'$ |
| 11. | 1000 | 7000 | value $k'$ |
| 12. | 1000 | 8000 | value $l'$ |
| 13. | 1500 | 3000 | value $m'$ |
| 14. | 1500 | 4000 | value $n'$ |
| 15. | 1500 | 5000 | value $o'$ |
| 16. | 1500 | 6000 | value $p'$ |
| 17. | 1500 | 7000 | value $q'$ |

| Entry No. | B (ft.) | B + C (ft.) | Power Back-off (dB) |
|---|---|---|---|
| 1. | 500 | 3000 | value $a''$ |
| 2. | 500 | 4000 | value $b''$ |
| 3. | 500 | 5000 | value $c''$ |
| 4. | 500 | 6000 | value $d''$ |
| 5. | 500 | 7000 | value $e''$ |
| 6. | 500 | 8000 | value $f''$ |
| 7. | 1000 | 3000 | value $g''$ |
| 8. | 1000 | 4000 | value $h''$ |
| 9. | 1000 | 5000 | value $i''$ |
| 10. | 1000 | 6000 | value $j''$ |
| 11. | 1000 | 7000 | value $k''$ |
| 12. | 1000 | 8000 | value $l''$ |
| 13. | 1500 | 3000 | value $m''$ |
| 14. | 1500 | 4000 | value $n''$ |
| 15. | 1500 | 5000 | value $o''$ |
| 16. | 1500 | 6000 | value $p''$ |
| 17. | 1500 | 7000 | value $q''$ |
| ⋮ | ⋮ | ⋮ | ⋮ |

FIG. 6

| Entry No. | B (ft.) | B + C (ft.) | Power Back-off (dB) |
|---|---|---|---|
| 1. | 500 | 1000 | 0 |
| 2. | 500 | 1500 | 0 |
| 3. | 500 | 2000 | 0 |
| 4. | 500 | 2500 | 0 |
| 5. | 500 | 3000 | 0 |
| 6. | 500 | 3500 | 0 |
| 7. | 500 | 4000 | 0 |
| 8. | 500 | 4500 | 0 |
| 9. | 500 | 5000 | 0 |
| 10. | 500 | 5500 | 0 |
| 11. | 500 | 6000 | 0 |
| 12. | 500 | 6500 | 0 |
| 13. | 500 | 7000 | 0 |
| 14. | 500 | 7500 | 0 |
| 15. | 500 | 8000 | 0 |
| 16. | 500 | 8500 | 0 |
| 17. | 500 | 9000 | 0 |
| 18. | 500 | 9500 | 0 |
| 19. | 500 | 10000 | 0 |
| 20. | 500 | 10500 | 0 |
| 21. | 500 | 11000 | 0 |
| 22. | 500 | 11500 | 2.099 |
| 23. | 500 | 12000 | 0 |
| 24. | 500 | 12500 | 0.634155 |
| 25. | 500 | 13000 | 0.252686 |
| 26. | 500 | 13500 | 0.582275 |
| 27. | 500 | 14000 | 0 |
| 28. | 500 | 14500 | 0 |
| 29. | 500 | 15000 | 0 |
| 30. | 500 | 15500 | 0 |
| 31. | 1000 | 1500 | 0 |
| 32. | 1000 | 2000 | 0 |
| 33. | 1000 | 2500 | 0 |
| 34. | 1000 | 3000 | 0 |
| 35. | 1000 | 3500 | 0 |
| 36. | 1000 | 4000 | 0 |
| 37. | 1000 | 4500 | 0 |
| 38. | 1000 | 5000 | 0 |
| 39. | 1000 | 5500 | 0 |
| 40. | 1000 | 6000 | 0 |
| 41. | 1000 | 6500 | 0 |

| Entry No. | B (ft.) | B + C (ft.) | Power Back-off (dB) |
|---|---|---|---|
| 42. | 1000 | 7000 | 0 |
| 43. | 1000 | 7500 | 0 |
| 44. | 1000 | 8000 | 0 |
| 45. | 1000 | 8500 | 0 |
| 46. | 1000 | 9000 | 2.26685 |
| 47. | 1000 | 9500 | 0 |
| 48. | 1000 | 10000 | 0.155029 |
| 49. | 1000 | 10500 | 0.338135 |
| 50. | 1000 | 11000 | 1.65955 |
| 51. | 1000 | 11500 | 4.61365 |
| 52. | 1000 | 12000 | 1.37878 |
| 53. | 1000 | 12500 | 2.99927 |
| 54. | 1000 | 13000 | 2.55066 |
| 55. | 1000 | 13500 | 2.85278 |
| 56. | 1000 | 14000 | 0 |
| 57. | 1000 | 14500 | 0.496826 |
| 58. | 1000 | 15000 | 0 |
| 59. | 1000 | 15500 | 0 |
| 60. | 2000 | 2500 | 0 |
| 61. | 2000 | 3000 | 0 |
| 62. | 2000 | 3500 | 0 |
| 63. | 2000 | 4000 | 0 |
| 64. | 2000 | 4500 | 0 |
| 65. | 2000 | 5000 | 0 |
| 66. | 2000 | 5500 | 0 |
| 67. | 2000 | 6000 | 0 |
| 68. | 2000 | 6500 | 0 |
| 69. | 2000 | 7000 | 0.423584 |
| 70. | 2000 | 7500 | 1.42761 |
| 71. | 2000 | 8000 | 2.63611 |
| 72. | 2000 | 8500 | 4.38171 |
| 73. | 2000 | 9000 | 8.21472 |
| 74. | 2000 | 9500 | 3.71948 |
| 75. | 2000 | 10000 | 5.24536 |
| 76. | 2000 | 10500 | 5.60242 |
| 77. | 2000 | 11000 | 6.82007 |
| 78. | 2000 | 11500 | 9.79858 |
| 79. | 2000 | 12000 | 6.18835 |
| 80. | 2000 | 12500 | 7.80884 |
| 81. | 2000 | 13000 | 7.43042 |
| 82. | 2000 | 13500 | 7.89429 |

FIG. 7B

| Entry No. | B (ft.) | B + C (ft.) | Power Back-off (dB) |
|---|---|---|---|
| 83. | 2000 | 14000 | 1.18347 |
| 84. | 2000 | 14500 | 4.90356 |
| 85. | 2000 | 15000 | 2.68494 |
| 86. | 2000 | 15500 | 0 |
| 87. | 3000 | 3500 | 0 |
| 88. | 3000 | 4000 | 0 |
| 89. | 3000 | 4500 | 0.887451 |
| 90. | 3000 | 5000 | 2.1814 |
| 91. | 3000 | 5500 | 3.19763 |
| 92. | 3000 | 6000 | 4.04907 |
| 93. | 3000 | 6500 | 4.78455 |
| 94. | 3000 | 7000 | 5.84351 |
| 95. | 3000 | 7500 | 7.00623 |
| 96. | 3000 | 8000 | 8.35815 |
| 97. | 3000 | 8500 | 10.2502 |
| 98. | 3000 | 9000 | 14.2084 |
| 99. | 3000 | 9500 | 9.08142 |
| 100. | 3000 | 10000 | 10.3845 |
| 101. | 3000 | 10500 | 10.946 |
| 102. | 3000 | 11000 | 12.0569 |
| 103. | 3000 | 11500 | 14.9286 |
| 104. | 3000 | 12000 | 11.0345 |
| 105. | 3000 | 12500 | 12.594 |
| 106. | 3000 | 13000 | 12.0721 |
| 107. | 3000 | 13500 | 12.475 |
| 108. | 3000 | 14000 | 5.80994 |
| 109. | 3000 | 14500 | 9.39575 |
| 110. | 3000 | 15000 | 7.06726 |
| 111. | 3000 | 15500 | 0.24353 |
| 112. | 4000 | 4500 | 2.36755 |
| 113. | 4000 | 5000 | 5.46814 |
| 114. | 4000 | 5500 | 7.3114 |
| 115. | 4000 | 6000 | 8.65112 |
| 116. | 4000 | 6500 | 9.80164 |
| 117. | 4000 | 7000 | 11.0315 |
| 118. | 4000 | 7500 | 12.3865 |
| 119. | 4000 | 8000 | 13.9398 |
| 120. | 4000 | 8500 | 16.0394 |
| 121. | 4000 | 9000 | 20.199 |
| 122. | 4000 | 9500 | 14.4128 |

| Entry No. | B (ft.) | B + C (ft.) | Power Back-off (dB) |
|---|---|---|---|
| 123. | 4000 | 10000 | 15.8899 |
| 124. | 4000 | 10500 | 16.3416 |
| 125. | 4000 | 11000 | 17.3547 |
| 126. | 4000 | 11500 | 20.1135 |
| 127. | 4000 | 12000 | 15.9753 |
| 128. | 4000 | 12500 | 17.4066 |
| 129. | 4000 | 13000 | 16.3416 |
| 130. | 4000 | 13500 | 17.0648 |
| 131. | 4000 | 14000 | 10.5432 |
| 132. | 4000 | 14500 | 14.4617 |
| 133. | 4000 | 15000 | 11.9012 |
| 134. | 4000 | 15500 | 4.76013 |
| 135. | 5000 | 5500 | 8.67859 |
| 136. | 5000 | 6000 | 12.0844 |
| 137. | 5000 | 6500 | 14.306 |
| 138. | 5000 | 7000 | 16.073 |
| 139. | 5000 | 7500 | 17.6874 |
| 140. | 5000 | 8000 | 19.3353 |
| 141. | 5000 | 8500 | 21.6882 |
| 142. | 5000 | 9000 | 26.1102 |
| 143. | 5000 | 9500 | 19.6252 |
| 144. | 5000 | 10000 | 21.3861 |
| 145. | 5000 | 10500 | 21.7126 |
| 146. | 5000 | 11000 | 22.6526 |
| 147. | 5000 | 11500 | 25.3381 |
| 148. | 5000 | 12000 | 20.9192 |
| 149. | 5000 | 12500 | 22.3138 |
| 150. | 5000 | 13000 | 21.6669 |
| 151. | 5000 | 13500 | 21.6882 |
| 152. | 5000 | 14000 | 15.2795 |
| 153. | 5000 | 14500 | 19.1736 |
| 154. | 5000 | 15000 | 16.7078 |
| 155. | 5000 | 15500 | 8.84644 |
| 156. | 6000 | 6500 | 16.1371 |
| 157. | 6000 | 7000 | 19.7626 |
| 158. | 6000 | 7500 | 22.2864 |
| 159. | 6000 | 8000 | 24.5569 |
| 160. | 6000 | 8500 | 27.0959 |
| 161. | 6000 | 9000 | 31.8445 |
| 162. | 6000 | 9500 | 24.6942 |
| 163. | 6000 | 10000 | 26.7938 |

| Entry No. | B (ft.) | B + C (ft.) | Power Back-off (dB) |
|---|---|---|---|
| 164. | 6000 | 10500 | 27.0502 |
| 165. | 6000 | 11000 | 27.9169 |
| 166. | 6000 | 11500 | 30.5261 |
| 167. | 6000 | 12000 | 25.8508 |
| 168. | 6000 | 12500 | 27.2089 |
| 169. | 6000 | 13000 | 26.5009 |
| 170. | 6000 | 13500 | 26.7786 |
| 171. | 6000 | 14000 | 19.8236 |
| 172. | 6000 | 14500 | 23.5712 |
| 173. | 6000 | 15000 | 21.1633 |
| 174. | 6000 | 15500 | 12.948 |
| 175. | 7000 | 7500 | 24.267 |
| 176. | 7000 | 8000 | 28.4875 |
| 177. | 7000 | 8500 | 32.0428 |
| 178. | 7000 | 9000 | 37.1332 |
| 179. | 7000 | 9500 | 29.7083 |
| 180. | 7000 | 10000 | 31.9818 |
| 181. | 7000 | 10500 | 32.2626 |
| 182. | 7000 | 11000 | 33.0804 |
| 183. | 7000 | 11500 | 35.6775 |
| 184. | 7000 | 12000 | 30.7245 |
| 185. | 7000 | 12500 | 32.0673 |
| 186. | 7000 | 13000 | 31.2128 |
| 187. | 7000 | 13500 | 31.3226 |
| 188. | 7000 | 14000 | 24.4501 |
| 189. | 7000 | 14500 | 27.9382 |
| 190. | 7000 | 15000 | 25.4114 |
| 191. | 7000 | 15500 | 17.2968 |
| 192. | 8000 | 8500 | 34.3988 |
| 193. | 8000 | 9000 | 41.1859 |
| 194. | 8000 | 9500 | 33.9349 |
| 195. | 8000 | 10000 | 36.7151 |
| 196. | 8000 | 10500 | 37.1667 |
| 197. | 8000 | 11000 | 38.0487 |
| 198. | 8000 | 11500 | 40.722 |
| 199. | 8000 | 12000 | 35.4852 |
| 200. | 8000 | 12500 | 36.7792 |
| 201. | 8000 | 13000 | 36.0559 |
| 202. | 8000 | 13500 | 35.8026 |
| 203. | 8000 | 14000 | 29.1101 |
| 204. | 8000 | 14500 | 32.3114 |

| Entry No. | B (ft.) | B + C (ft.) | Power Back-off (dB) |
|---|---|---|---|
| 205. | 8000 | 15000 | 29.6014 |
| 206. | 8000 | 15500 | 21.618 |
| 207. | 9000 | 9500 | 35.5066 |
| 208. | 9000 | 10000 | 40.1453 |
| 209. | 9000 | 10500 | 41.3049 |
| 210. | 9000 | 11000 | 42.5409 |
| 211. | 9000 | 11500 | 45.3455 |
| 212. | 9000 | 12000 | 40.0232 |
| 213. | 9000 | 12500 | 41.366 |
| 214. | 9000 | 13000 | 40.4535 |
| 215. | 9000 | 13500 | 40.7922 |
| 216. | 9000 | 14000 | 33.6542 |
| 217. | 9000 | 14500 | 37.0355 |
| 218. | 9000 | 15000 | 33.9105 |
| 219. | 9000 | 15500 | 25.6952 |
| 220. | 10000 | 10500 | 42.489 |
| 221. | 10000 | 11000 | 45.5652 |
| 222. | 10000 | 11500 | 49.0422 |
| 223. | 10000 | 12000 | 44.1125 |
| 224. | 10000 | 12500 | 45.6293 |
| 225. | 10000 | 13000 | 44.9091 |
| 226. | 10000 | 13500 | 44.967 |
| 227. | 10000 | 14000 | 37.8534 |
| 228. | 10000 | 14500 | 41.6223 |
| 229. | 10000 | 15000 | 38.3264 |
| 230. | 10000 | 15500 | 29.6381 |
| 231. | 11000 | 11500 | 48.0066 |
| 232. | 11000 | 12000 | 46.2518 |
| 233. | 11000 | 12500 | 48.5956 |
| 234. | 11000 | 13000 | 48.6536 |
| 235. | 11000 | 13500 | 48.7512 |
| 236. | 11000 | 14000 | 42.0129 |
| 237. | 11000 | 14500 | 44.6375 |
| 238. | 11000 | 15000 | 42.5653 |
| 239. | 11000 | 15500 | 33.6298 |
| 240. | 12000 | 12500 | 46.4838 |
| 241. | 12000 | 13000 | 49.4989 |
| 242. | 12000 | 13500 | 51.156 |
| 243. | 12000 | 14000 | 45.2356 |
| 244. | 12000 | 14500 | 48.5956 |
| 245. | 12000 | 15000 | 46.5204 |

FIG. 7F

| Entry No. | B (ft.) | B + C (ft.) | Power Back-off (dB) |
|---|---|---|---|
| 246. | 12000 | 15500 | 37.4017 |
| 247. | 13000 | 13500 | 46.9934 |
| 248. | 13000 | 14000 | 46.5173 |
| 249. | 13000 | 14500 | 50.5579 |
| 250. | 13000 | 15000 | 49.447 |
| 251. | 13000 | 15500 | 40.7343 |
| 252. | 14000 | 14500 | 46.2152 |
| 253. | 14000 | 15000 | 48.3972 |
| 252. | 14000 | 15500 | 42.7087 |
| 253. | 15000 | 15500 | 40.3436 |

FIG. 7G

DATA COMMUNICATION SYSTEM AND METHOD CAPABLE OF LIMITING EFFECTS OF CROSSTALK BY ADJUSTING TRANSCEIVER POWER LEVELS

CROSS-REFERENCE TO RELATED APPLICATION

This document claims priority to and the benefit of the filing date of copending and commonly assigned U.S. provisional patent application entitled "Data Communication System and Method Capable of Limiting Effects of Crosstalk by Adjusting Transceiver Power Levels," assigned Ser. No. 60/433,489, and filed Dec. 13, 2002, which is incorporated herein by reference.

BACKGROUND OF THE INVENTION

1. Field of the Invention

The present invention generally relates to data communication techniques and, in particular, to a data communication system and method for adjusting transmission power levels of one or more transceivers in order to limit the effects of crosstalk for other transceivers communicating within the same binder or cable.

2. Related Art

In a typical telecommunication system, transceivers at a central office usually communicate over one or more communication connections, sometimes referred to as "subscriber lines," to remote transceivers, sometimes referred to as "customer transceivers," located at various customer premises. Network service providers strategically deploy multiple central offices in an effort to keep the lengths of the communication connections between the central office transceivers and the customer transceivers within a desirable or specified range. Moreover, as the demand for network services increases, network service providers typically add more equipment at the central offices and/or add more central offices.

In some situations, a network service provider will add a remote terminal, also referred to as an "intermediate terminal," which is often smaller than a central office. Transceivers at an intermediate terminal, like transceivers at a central office, communicate over one or more communication connections to transceivers located at various customer premises. However, as compared to central office transceivers, an intermediate terminal transceiver is typically located substantially closer to its corresponding customer premises transceiver. For example, transceivers at a central office often communicate with customer premises transceivers over distances up to approximately four miles, whereas transceivers at an intermediate terminal often communicate with customer premises transceivers over distances less than approximately two miles.

In some instances, communication connections from an intermediate terminal are located within a close proximity of communication connections from a central office. For example, communication connections from an intermediate terminal may be bound within the same binder or cable as communication connections from a central office. In such instances, crosstalk from transceivers at the intermediate terminal may significantly interfere with signals transmitted by transceivers at the central office.

In this regard, crosstalk from a transceiver at the intermediate terminal typically travels shorter distances and is, therefore, less attenuated than crosstalk from a transceiver at the central office. As a result, crosstalk from the transceiver at the intermediate terminal is often at a significantly higher power level than crosstalk from the transceiver at the central office. This higher power level for the crosstalk from the intermediate terminal transceiver often exacerbates the adverse effects of crosstalk interference for the signals transmitted from the central office transceiver. In fact, crosstalk from the intermediate terminal transceiver may cause the signal-to-noise ratio of signals from the central office transceiver to fall below acceptable levels.

SUMMARY OF THE INVENTION

Generally, the present invention provides a system and method for adjusting transmission power levels of transceivers in order to reduce crosstalk.

A system in accordance with an exemplary embodiment of the present invention utilizes a transmitter and logic. The transmitter is configured to transmit signals to a customer transceiver over a first communication connection that is bound within a binder. The logic is configured to estimate a distance of a data path between the transmitter and the customer transceiver based on at least one signal communicated over the data path. The logic is further configured to adjust a transmission power level of the transmitter based on the estimated distance such that signals transmitted by the transmitter to the customer transceiver are spectrally compatible with signals transmitted from another transceiver over a second communication connection that is bound within the binder.

The present invention can also be viewed as a method for providing spectrum management in a data communication system having central office transceivers and intermediate terminal transceivers coupled through a feeder distribution interface to customer transceivers. The method can be broadly conceptualized by the following steps: automatically determining at least one distance between the transceivers and the feeder distribution interface; and automatically adjusting, based on the determined distance, a transmission power of at least one of the intermediate terminal transceivers in order to maintain performance margins for the central office transceivers.

Various features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

FIG. 5 is a diagram illustrating a set of exemplary tables that may be utilized for determining a suitable transmission power level of an intermediate terminal transceiver, such as is depicted in FIG. 2.

FIG. 6 is a diagram illustrating an exemplary table that may be utilized for determining a suitable transmission power level of an intermediate terminal transceiver, such as is depicted in FIG. 2.

FIGS. 7A-7G depict entries comprising exemplary minimum power back-off values that may be utilized to determine a suitable transmission power level of an intermediate terminal transceiver for achieving spectral compatibility in accordance with current asymmetric digital subscriber line (ADSL) standards.

DETAILED DESCRIPTION

The present invention generally pertains to a system and method for dynamically controlling transmission power levels of transceivers in order to ensure that specified transceiver performance margins are satisfied. In a preferred embodiment of the present invention, the distance between two transceivers engaged in a communication session is estimated during a training phase of a data communication session between the two transceivers. Based on the estimated distance, the transmission power level of at least one of the transceivers is dynamically adjusted in order to ensure that specified performance margins of other transceivers communicating within the same binder or cable are not violated due to crosstalk induced by the one transceiver.

In particular, the transmission power level of the one transceiver is preferably adjusted such that the signals communicated by the one transceiver are "spectrally compatible" with signals communicated by other transceivers within the same binder or cable. Note that whether or not a signal is "spectrally compatible" is typically defined by an agreed upon standard. For example, in North America, T1.417-2001 *Spectrum Management for Loop Transmission*, referred to hereafter as "T1.417," which is incorporated herein by reference, presently defines whether or not a signal is spectrally compatible with another signal communicated within the same binder or cable. Other standards define spectral compatibility for other types of communication, and it should be noted that standards for defining spectral compatibility may be changed over time.

Figure 1:
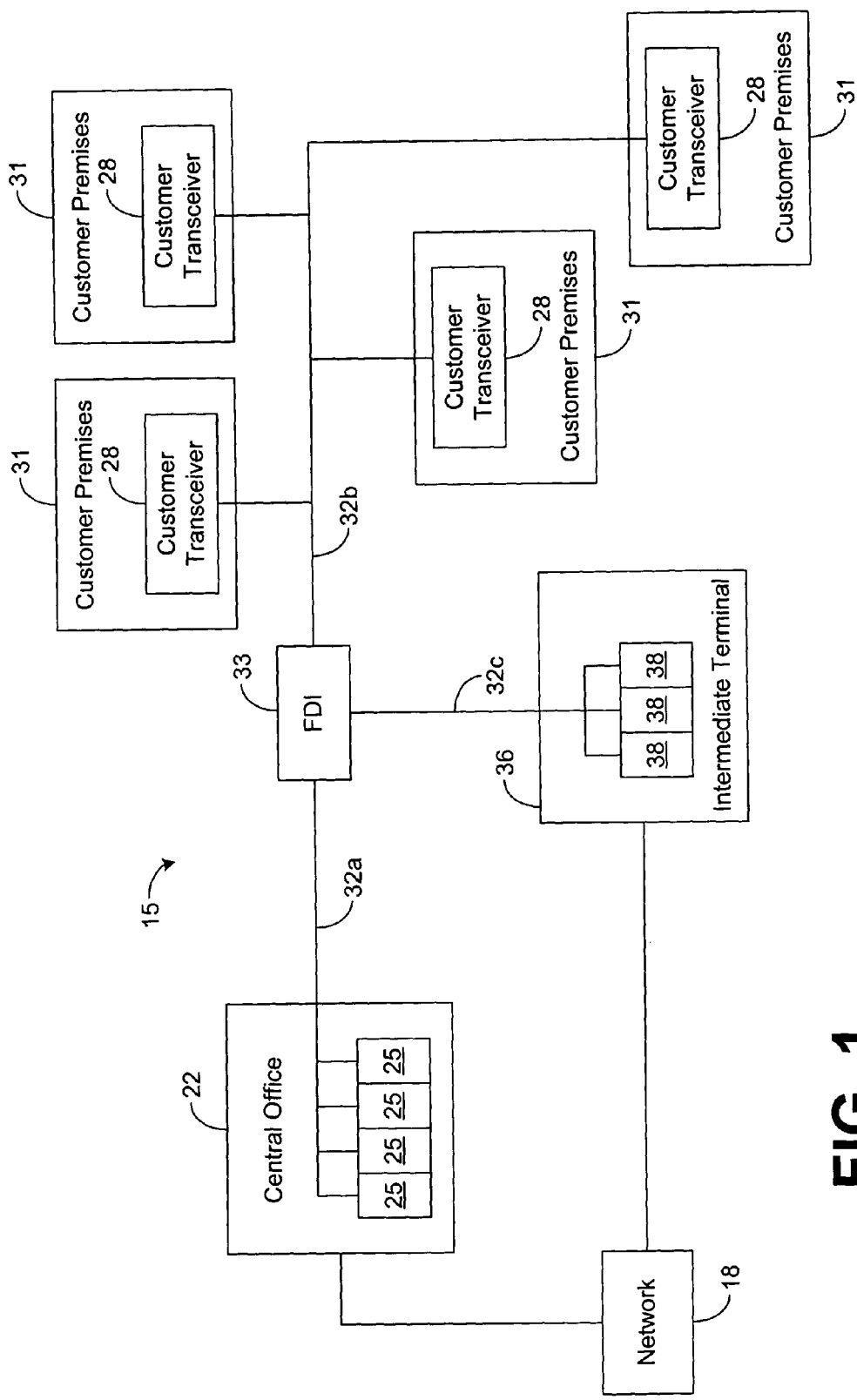
FIG. 1 is a block diagram illustrating a communication system in accordance with the prior art.

FIG. 1 depicts a conventional communication system 15 enabling communication with a network 18, such as the publicly switched telephone network (PSTN) or Internet, for example. As shown by FIG. 1, the system 15 comprises a central office 22. One or more central office transceivers 25 are located at the premises of the central office 22 and communicate with various remote transceivers 28, referred to as "customer transceivers," residing at one or more customer premises 31. The central office transceivers 25 communicate with the customer transceivers 28 over multiple cables or binders 32a and 32b that are interconnected via a feeder distribution interface 33, as shown by FIG. 1. Each cable 32a-32c depicted by FIG. 1 may comprise multiple communication connections (not specifically shown) separately insulated for allowing multiple signals to be simultaneously transmitted through the cable 32a-32c. Each such connection may comprise copper wires, sometimes referred to as a "twisted pair," or some other type of known or future-developed transmission medium.

During operation, signals from the network 18 may be routed to the central office transceivers 25, which communicate the signals to the customer transceivers 28 via known techniques. Signals transmitted from the customer transceivers 28 may be received by the central office transceivers 25, which pass such signals to the network 18. The network 18 then routes the signals to their appropriate destinations, which may be other transceivers (not specifically shown) serviced by other central offices (not specifically shown).

In an effort to satisfy increasing demand by customers, a network service provider may construct an intermediate terminal 36 and install one or more intermediate terminal transceivers 38 at the premises of the intermediate terminal 36. Similar to the central office transceivers 25, the intermediate terminal transceivers 38 may communicate with one or more of the customer transceivers 28 over multiple cables or binders 32b and 32c that are interconnected via the feeder distribution interface 33.

Moreover, it is common for signals from both the central office transceivers 25 and the intermediate terminal transceivers 38 to be communicated or propagated through the same cable at the far-end of a subscriber line. More specifically, it is common for signals transmitted from one or more of the central office transceivers 25 and from one or more of the intermediate terminal transceivers 38 to be simultaneously communicated through cable 32b. As a result, far-end crosstalk (FEXT) may occur within the foregoing cable 32b. Such crosstalk generally degrades the signal-to-noise ratios of signals transmitted from the intermediate terminal transceivers 38 and the central office transceivers 25. Typically, for at least the reasons set forth below, the effects of such crosstalk are more pronounced for the signals transmitted from the central office transceivers 25 than for the intermediate terminal transceivers 38.

In this regard, the intermediate terminal 36 and, therefore, the intermediate terminal transceivers 38 are typically located closer to the customer transceivers 28 shown by FIG. 1 than the central office 22 and, therefore, the central office transceivers 25. As a result, a signal transmitted from a customer transceiver 38 typically exhibits a higher power level within the cable 32b than a signal transmitted from a central office transceiver 28. Thus, crosstalk noise is generally more significant for the signals transmitted from the central office transceivers 25 than for the signals transmitted from the intermediate terminal transceivers 38. Indeed, in some circumstances, crosstalk noise induced by one or more of the intermediate terminal transceivers 38 may cause the signal-to-noise ratio for one or more of the signals transmitted from the central office transceivers 25 to fall below acceptable levels. As a result, one or more of the central office transceivers 25 may be unable to communicate at or above a specified minimum data rate, as defined by an applicable standard, such as T1.417, for example. In such a situation, the signals communicated by the one or more intermediate terminal transceivers 38 are not spectrally compatible with the signals communicated by the one or more central office transceivers 25.

Figure 2:
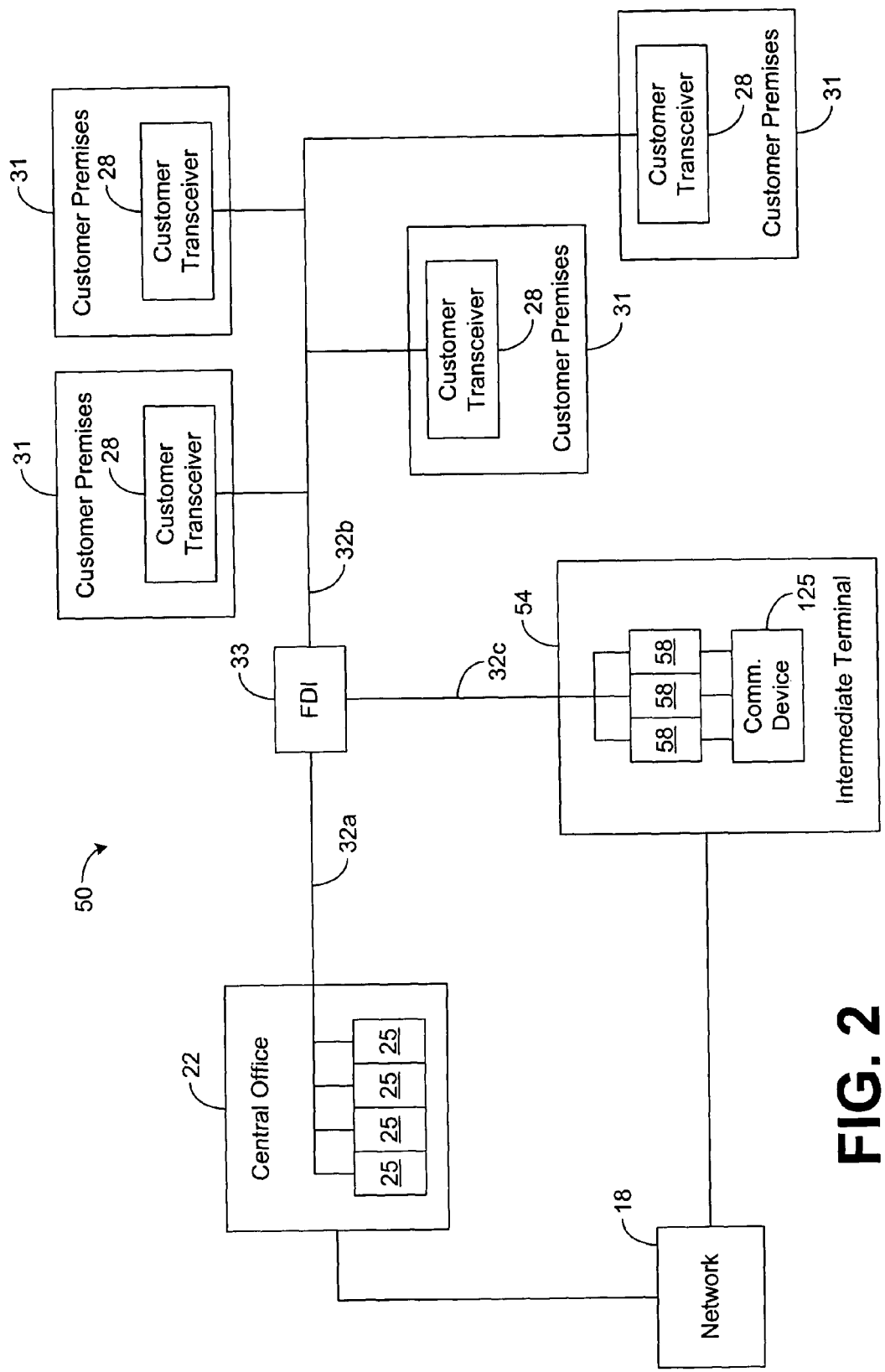
FIG. 2 is a block diagram illustrating a communication system in accordance with an exemplary embodiment of the present invention.

A system in accordance with a preferred embodiment of the present invention provides dynamic adjusting of an intermediate terminal transceiver's transmission power level in an effort to make the transceiver's signals spectrally compatible with the signals of other transceivers communicating within the same binder or cable. In this regard, FIG. 2 depicts a communication system 50 in accordance with a preferred embodiment of the present invention. Similar to the conventional system 15 depicted by FIG. 1, the system 50 comprises a central office 22 and an intermediate terminal 54 having transceivers 25 and 58, respectively, that communicate with various customer transceivers 28 residing at one or more customer premises 31.

The intermediate terminal 54 and its transceivers 58 are preferably located significantly closer to the customer transceivers 28 than the central office 22. For example, the central office 22 may be located up to approximately four miles from the customer transceivers 28, whereas the intermediate terminal 54 may be located any distance up to approximately two miles from the customer transceivers 28. Note that other distances from the customer transceivers 28 for the central office 22 and the intermediate terminal 54 are possible for other embodiments.

Similar to the embodiment shown by FIG. 1, each of the central office transceivers 25 of FIG. 2 may be coupled to and communicate data with one or more customer transceivers 28, and each of the intermediate terminal transceivers 58 also may be coupled to and communicate data with one or more customer transceivers 28. Signals transmitted by the customer transceivers 28 and received by a transceiver 25 or 58 may be passed to the network 18. Such signals may then be routed to one or more transceivers (not specifically shown) serviced by another central office or intermediate terminal (not specifically shown).

In addition, the network 18 may route, to the central office 22, signals destined for any of the customer transceivers 28 coupled to a central office transceiver 25, and the network 18 may route, to the intermediate terminal 54, signals destined for any of the customer transceivers 28 coupled to an intermediate terminal transceiver 58. When the central office 22 receives a signal destined for one of the customer transceivers 28, the central office transceiver 25 coupled to such customer transceiver 28 transmits the signal to the customer transceiver 28. Similarly, when the intermediate terminal 54 receives a signal destined for one of the customer transceivers 28, the intermediate terminal transceiver 58 coupled to such customer transceiver 28 transmits the signal to the customer transceiver 28.

In an effort to prevent the signal-to-noise ratios for the signals transmitted by the central office transceivers 25 from falling below acceptable or specified levels, the intermediate terminal transceivers 58 of the preferred embodiment automatically adjust their transmission power levels based, in part, on the lengths of the data paths defined by the cables 32a-32c. As an example, if T1.417 is the applicable standard, then a distance that may be used to determine, in part, the transmission power level of an intermediate terminal transceiver 58 may be the equivalent 26 AWG distance as defined in T1.417. Exemplary techniques for controlling the transmission power levels of the intermediate terminal transceivers 58 will be described in more detail hereinbelow.

Figure 3:
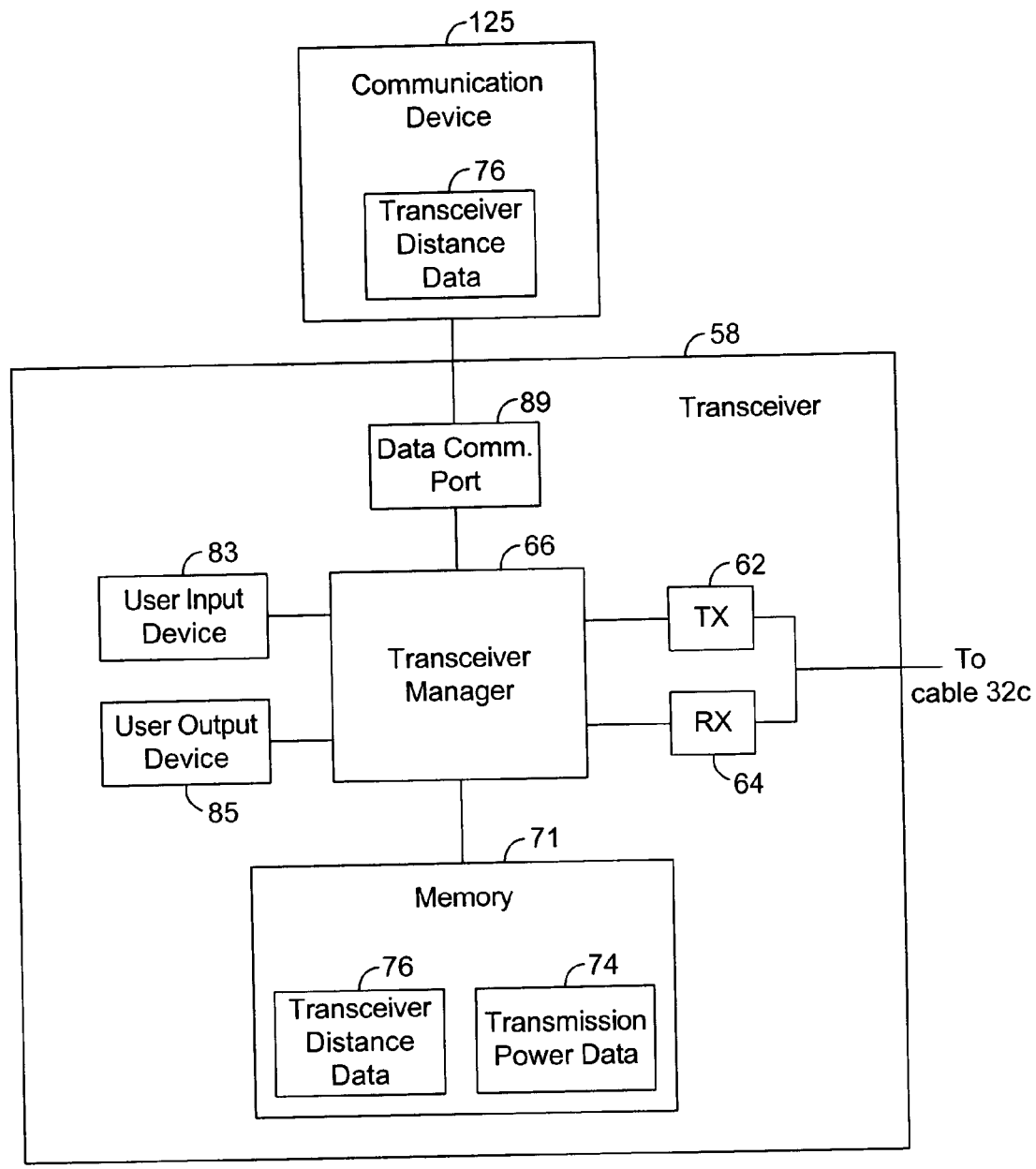
FIG. 3 is a block diagram illustrating a more detailed view of an intermediate terminal transceiver depicted in FIG. 2.

FIG. 3 illustrates a more detailed view of an intermediate terminal transceiver 58 in accordance with the preferred embodiment of the present invention. As can be seen by referring to FIG. 3, the transceiver 58 comprises a transmitter (TX) 62 and a receiver (RX) 64 for respectively transmitting and receiving signals over a connection within cable 32c. The transceiver 58 also comprises a transceiver manager 66 for controlling the operation of the transceiver 58. The transceiver manager 66 may be implemented in hardware, software, or any combination thereof. Note that when at least a portion of the transceiver manager 66 is implemented in software, the transceiver 58 may include a processing element (not shown), such as a digital signal processor or a central processing unit, for executing the software of the transceiver manager 66. In addition, any software portion of the transceiver manager 66 may be stored on a computer-readable medium.

In the context of this document, a "computer-readable medium" can be any means that can contain, store, communicate, propagate, or transport a program for use by or in connection with an instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The customer transceiver 58 of FIG. 3 preferably comprises memory 71 for storing transmission power data 74 and transceiver distance data 76, which will be discussed in more detail hereinbelow. Note that any portion of the transceiver manager 66 implemented in software can be stored in the memory 71, if desired. Furthermore, the transceiver 58 of FIG. 3 may comprise a user input interface 83, such as a keypad, for example, for enabling user to manually input data into the transceiver 58, and the transceiver 58 also may comprise a user output device 85, such as one or more light emitting diodes (LEDs) or a liquid crystal display (LCD), for example, for enabling the transceiver 58 to output information to a user. The transceiver 58 may also comprise a data communication port 89 for enabling the transceiver 58 to receive data from one or more devices external to the transceiver 58.

Figure 4:
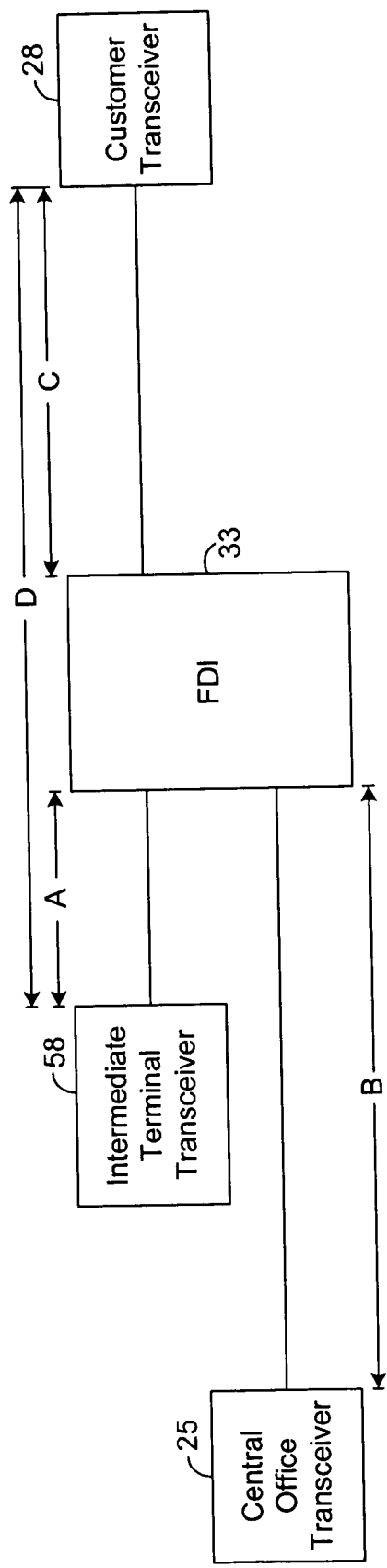
FIG. 4 is a block diagram illustrating an exemplary nomenclature for distances between transceivers and a feeder distribution interface, such as is depicted in FIG. 2.

When a communication session between the intermediate terminal transceiver 58 of FIG. 3 and a customer transceiver 28 (FIG. 2) is invoked, the transceiver manager 66 of the intermediate terminal transceiver 58 is preferably configured to estimate the approximate distance, referred to hereafter as "D" (FIG. 4), of the data path between the transceiver 58 and the customer transceiver 28 during a training phase of the invoked communication session. Various known or future-developed techniques for estimating the distance between two communicating transceivers may be employed by the transceiver manager 66 in order to derive distance "D."

As an example, the customer transceiver 28 may be configured to transmit, during training, a signal at a predefined power level, which is known by the transceiver manager 66. This signal may be received by the transceiver 58, and the transceiver manager 66 may measure the power level of the received signal. Based on the difference of the power level of the signal, as transmitted by the customer transceiver 28, and the power level of the signal, as received by the intermediate terminal transceiver 58, the transceiver manager 66 may estimate the approximate distance between the transceivers 28 and 58. Such techniques for determining the distance between two transceivers are generally well-known in the art. However, it should be noted that other types of techniques for estimating the distance "D" may be employed without departing from the principles of the present invention.

Based on the estimated distance "D" between the intermediate terminal transceiver 58 and the customer transceiver 28, the transceiver manager 66 preferably determines a transmission power level for the transceiver 58. More specifically, the transceiver manager 66, based on the estimated distance "D," adjusts the transmission power level of the transceiver 58 such that the signals transmitted by the transceiver 58 are spectrally compatible, as defined by the applicable standard.

For example, if the transceiver 58 is configured to communicate within North America, then the transceiver manager 66 preferably causes the transceiver 58 to communicate at a power level that is spectrally compatible, as defined by the applicable North American standard (e.g., T1.417).

In this regard, the applicable standard normally specifies a minimum signal-to-noise ratio for the signals communicated according to the standard. If a first transceiver induces a level of crosstalk that causes the signal-to-noise ratio of another transceiver to fall below an acceptable level, as defined by the applicable standard, then the first transceiver is not considered to be "spectrally compatible." Note that methods other than using a signal-to-noise ratio for defining spectral compatibility, such as for example, known power spectral density (PSD) mask based methods, may be used without departing from the principles of the present invention.

Thus, in order to ensure that the signals transmitted by the intermediate terminal transceiver 58 are spectrally compatible, the transceiver manager 66 may be configured to adjust (e.g., reduce) the transmission power level of the transceiver 58 such that the crosstalk induced by the transceiver 58 does not cause the signal-to-noise ratios of the signals transmitted by the central office transceivers 25 to fall below acceptable levels, as defined by the applicable standard. Since crosstalk induced by the intermediate terminal transceiver 58 is usually less attenuated than the crosstalk induced by the central office transceivers 25, the transceiver manager 66 may be configured to cause the transceiver 58 to transmit signals at a reduced power level in order to ensure that such signals are spectrally compatible.

In this regard, after estimating distance "D" during the training phase of a communication session with a customer transceiver 28, the transceiver manager 66 preferably determines whether or not signals transmitted by the transceiver 58 are spectrally compatible when the transceiver 58 is transmitting at its normal or default transmission power level. If such signals are not spectrally compatible, then the transceiver manager 66 preferably reduces the transmission power level of the transceiver 58 until the signals transmitted by the transceiver 58 are spectrally compatible.

Note that it is possible to compute whether the signals transmitted by the transceiver 58 at a given transmission power level are spectrally compatible with signals transmitted from a central office transceiver within the same binder or cable when the following distances are known: (1) the approximate distance from the intermediate terminal 54 to the FDI 33, (2) the approximate distance from the central office 22 to the FDI 33, and (3) the approximate distance from the FDI 33 to the customer transceiver 28 that is in communication with the intermediate terminal transceiver 58. For illustrative purposes, the foregoing distances are labeled "A," "B," and "C," respectively, in FIG. 4. Note that, for the purposes of determining whether an intermediate terminal transceiver 58 is spectrally compatible, it is preferably assumed that the customer transceiver 28 in communication with the intermediate terminal transceiver 58 and the customer transceivers 28 in communication with central office transceivers 25 are collocated (i.e., located the same distance from the FDI 33).

Moreover, during operation, the central office 22, FDI 33, and intermediate terminal 58 are stationary, and the distances "A" and "B" are constants. Therefore, the distances between these locations can be estimated and then input to the transceiver 58. Note that the transceiver distance data 76 of FIG. 3 preferably comprises values indicative of the estimated distances "A" and "B." Estimating the distance "C" (i.e., the distance between the FDI 33 and the customer transceiver 28), on the other hand, is more problematic as this distance depends on which of the transceivers 28 is in communication with the intermediate terminal transceiver 58.

However, as set forth above, the transceiver 58 may estimate the distance "D" between it and the customer transceiver 28 during a training phase, and the transceiver manager 66 may subtract the distance "A" from the distance "D" in order to determine the distance "C." Therefore, after estimating "D" during the training phase, as described above, the transceiver manager 66 has sufficient information in order to determine whether the signals transmitted by the transceiver 58 are spectrally compatible.

It should be noted that there are various methodologies that may be employed by the transceiver manager 66 to ensure that the transmission power level of the transceiver 58 is spectrally compatible. Various exemplary techniques for testing the spectral compatibility of the signals transmitted by the transceiver 58 will now be described hereinbelow.

In a first embodiment, the transceiver manager 66 may be configured to calculate a maximum spectrally compatible power value for the transceiver 58 based on the estimated distances "A," "B," and "C." The "maximum spectrally compatible power value" refers to a value indicative of the maximum transmission power level at which the signals transmitted by the transceiver 58 are spectrally compatible with the signals transmitted from the central office transceivers 25 over the same cable 32*b*. If the default transmission power level of the transceiver 58 exceeds the level indicated by the calculated maximum spectrally compatible power value, then the transceiver manager 66 reduces the transmission power level of the transceiver 58 to a level at or below the level indicated by the maximum spectrally compatible power value.

Note that, for simplicity, the transmission power level may be reduced equally for all frequencies within the transmission band of the transceiver 58. However, such a feature is not necessary for implementing the present invention. Indeed, in other embodiments, the power level reduction algorithm employed to reduce the transmission power level to achieve spectral compatibility, as described herein, may adjust the transmission power levels of different frequency ranges by different amounts. For example, if the transmission bands of the intermediate terminal transceivers 58 and the central office transceivers 25 are not identical, then it is possible to achieve spectral compatibility by adjusting the transmission power levels of the intermediate terminal transceivers 58 within bands that overlap with the transmission bands of the central office transceivers 25. Also, improved intermediate terminal performance may be achieved by using transmit power levels which vary with frequency according to the crosstalk coupling function and loop loss function.

In addition, it is not necessary for the transceiver manager 66 to calculate the maximum spectrally compatible power value. For example, in other embodiments, the maximum spectrally compatible power value may be predetermined (e.g., previously calculated), and data indicative of the maximum spectrally compatible power value for various possible combinations of distances "A," "B," and "C" may be stored in the transceiver's memory 71 as transmission power data 74. Such data 74 may be in the form of a look-up table or some other suitable form whereby the transceiver manager 66 can retrieve the appropriate maximum spectrally compatible power value based on the actual estimated distances "A," "B," and "C."

As an example, the power transmission data 74 may comprise a value indicative of the maximum transmission power level for each combination of distances "A," "B," and "C" defined by the data 74. Each such value may be stored in an entry of the data 74 along with its corresponding combination of distances "A," "B," and "C." The combination of distances in each entry may serve as a key for retrieving the appropriate maximum transmission power value. Thus, after determining or estimating distances "A," "B," and "C," the transceiver manager 66 may simply retrieve the appropriate maximum spectrally compatible power value from the transmission power data 74 and reduce the transmission power level of the transceiver 58 such that it does not exceed the maximum spectrally compatible power level indicated by the value retrieved from memory. Note that if the actual estimated distances "A," "B," and "C" do not precisely correspond to the distance values of a single entry, the maximum spectrally compatible power level values may be interpolated from multiple entries.

In another example, each entry of the power transmission data 74 may comprise a "minimum power back-off value" rather than a maximum spectrally compatible power level value. The minimum power back-off value preferably corresponds a minimum amount that the default power level of the transceiver 58 is to be reduced in order to achieve spectral compatibility for the signals transmitted by the transceiver 58. Thus, after determining distances "A," "B," and "C," the transceiver manager 66 may retrieve the appropriate minimum power back-off value (using the determined distances "A," "B," and "C" as a key) and, based on the retrieved value, reduce the power transmission level of the transceiver 58 such that the signals transmitted by the transceiver 58 are spectrally compatible with the signals transmitted from the central office transceiver 25.

To facilitate the look-up process, the entries of the transmission power data 74 may be grouped into various tables. FIG. 5 depicts an embodiment where the transmission power data 74 is comprised of a plurality of tables 112, in which each table 112 corresponds to a particular distance "A" (i.e., the distance between the intermediate terminal transceiver 58 and the FDI 33). As shown by FIG. 5, each table 112 comprises a plurality of entries, and each of the entries has values indicative of different combinations of the other distances "B" and "C." Each entry also stores a value indicative of the minimum power back-off that is required to achieve spectral compatibility when the configuration of the system 50 corresponds to the combination of distances "A," "B," and "C" associated with the entry. Such values are represented in FIG. 5 as values a' through q'.

As an example, assume that the distances "A," "B," and "C" are estimated to be 1000 feet, 1000 feet, and 6000 feet, respectively, and assume that the minimum power back-off for the transceiver 58, in such a configuration, is 12.98 decibels (dB). In such an example, value k' of entry "11" of the table 112 corresponding to A=1000 feet is preferably 12.98. Thus, the transceiver manager 66, in such an example, may identify the foregoing entry based on the estimated distances "A," "B," and "C" and then utilize the minimum power back-off value (i.e., value k') in this entry to reduce the power level of transceiver 58 by a corresponding amount such that the transceiver 58 is spectrally compatible during its communication with the customer transceiver 28.

Note that if the estimated distances "A," "B," and/or "C" do not precisely correspond to the distance values of the tables 112, then the transceiver manager 66 may interpolate the minimum power back-off value based on a plurality of minimum power-back off levels stored in the tables 112. For example, if the estimated distances "A," "B," and "C" are 1000 feet, 1000 feet, and 5500 feet, respectively, then the transceiver manager 66 may interpolate a minimum power back-off value from the minimum power back-off values (i.e., back-off values j' and k') stored in entries "10" and "11" of the table 112 corresponding to A=1000 feet. Alternatively, the transceiver manager 66 may select one of the closest matching entries "10" or "11," and utilize the minimum power back-off value of the selected entry. In such an embodiment, the transceiver manager 66 preferably selects the entry with the highest minimum power back-off value to ensure that spectral compatibility is indeed achieved.

In another example, the estimated distance "A" may fall between two tables 112. As an example, the estimated distance "A" may be 750 feet, and the two closest matching tables 112 may correspond to 500 feet and 1000 feet respectively. In such an example, the transceiver manager 66 may determine a minimum power back-off value from the 500 feet table and a minimum power back-off value from the 1000 feet table and then interpolate a final minimum power back-off value. Alternatively, the transceiver manager 66 may select one of the minimum power back-off values determined from one of the two tables. In such an embodiment, the transceiver manager 66 preferably selects the higher of the two minimum power-back off values in order to ensure that spectral compatibility is indeed achieved.

Note that it is possible for each of the tables 112 to correspond with a particular value of "B" or "C" rather than for a particular value for "A." For example, each different table 112 may correspond to a different value of "B." In such an example, the key data of each entry may comprise values indicative of a different combination of "A" and "C."

In yet another embodiment, the transceiver manager 66 may be configured to calculate a new minimum power back-off value from the minimum power back-off value determined from one of the tables 112. For example, the transmission power data 74 may comprise a table 112, such as depicted in FIG. 6, that stores the minimum power back-off values a" through q" for a transceiver 58 assuming that the transceiver 58 is located at the FDI 33 (i.e., "A" equals zero). If desired, the transceiver manager 66 may be configured to reduce the transmission power level of the transceiver 58 by an amount corresponding to the minimum power back-off value determined, based on the estimated values of "B" and "C," from the foregoing table 112.

However, since the transceiver 58 is actually located at the intermediate terminal 58 rather than the FDI 33 (i.e., since "A" is actually greater than zero), the power back-off implemented by the transceiver manager 66 is greater than what is required to achieve spectral compatibility. In other words, utilizing the power back-off values determined from the table 112 of FIG. 6 ensures spectral compatibility but causes the transceiver manager 66 to reduce the transmission power level of the transceiver 58 to a level lower than what is required for spectral compatibility. As a result, the signal-to-noise ratio of the signals communicated by the transceiver 58 may not be optimized.

To help improve the performance of the intermediate terminal transceiver 58, the transceiver manager 66 may be configured to calculate a new minimum power back-off value from the minimum power back-off value determined from the table 112 of FIG. 6. In this regard, the transceiver manager 66 may be configured to determine a value, referred to hereafter as the "attenuation value," indicative of the approximate amount of attenuation that occurs between the transceiver 58 and the FDI 33. Such an amount of attenuation is preferably based on the distance "A." Note that the transceiver manager 66 may be configured to calculate the attenuation value based on the distance "A" indicated by the transceiver distance data 26, or the attenuation value may be predetermined and simply stored in the memory 71. Moreover, the transceiver manager 66 may be configured to subtract the attenuation value from the minimum power back-off value determined from the table 112 of FIG. 6 in order to calculate the new minimum power back-off value. Note that if the attenuation value is greater than the minimum power back-off value determined from the table 112, then the new minimum power back-off value is preferably set to zero.

After calculating the new minimum power back-off value, the transceiver manager 66 may be configured to reduce the transmission power level of the transceiver 58 by an amount corresponding to the new minimum power back-off value. Reducing the minimum power back-off value in the foregoing manner helps the transceiver 58 to communicate signals at higher power levels while ensuring that the signals remain spectrally compatible with the signals transmitted over cable 32b from the central office transceivers 25.

According to the techniques described above, the value "C" may be estimated during the training phase of a data communication session between the intermediate terminal transceiver 58 and a customer transceiver 28. Further, the values of "A" and "B" may be predetermined and stored in the memory 71 (FIG. 3). These values may be manually input into the transceiver 58 via user input interface 83, if desired. However, a more efficient approach may be to automatically provide such values to multiple ones of the transceivers 58 residing at the intermediate terminal 54 via a communication device 125 located external to the transceivers 58. The communication device 125 may be located at the intermediate terminal 54, as shown by FIG. 2, or the device 125 may be located elsewhere. If the communication device 125 is located elsewhere, it may be desirable for the device 125 to communicate with the intermediate terminal transceivers 58 over network 18.

As shown by FIG. 3, the communication device 125 preferably stores data 76 indicative of at least the approximate distances "A" and "B" and transmits this data 76 to one or more transceivers 58 when such transceivers 58 are installed at the intermediate terminal 54. For example, upon installation of a transceiver 58 at the intermediate terminal 54, the transceiver manager 66 of the transceiver 58 may be configured to read data from the communication device 125 to determine whether or not the transceiver 58 is located at an intermediate terminal 54. In embodiments when the transceiver 58, unlike FIG. 2, is not actually located at an intermediate terminal but is rather located at a central office 22, for example, the transceiver manager 66 may cause the transceiver 58 to communicate with customer transceivers 28 according to its default transmission power level. However, if the transceiver manager 66 determines that the transceiver 58 has been installed at an intermediate terminal 54, as shown by FIG. 2, then the transceiver manager 66 preferably adjusts the transmission power level of the transceiver 58 during communication sessions with customer transceivers 28, according to the techniques described hereinabove. Further, in such an embodiment, the transceiver manager 66 may read the values of "A" and "B" from the data 76 stored in the communication device 125.

Note that the communication device 125 may be configured to determine when a new transceiver 58 is installed at the intermediate terminal 54 and to automatically transmit the data 76 stored therein to the newly installed transceiver 58. Alternatively, the transceiver manager 66 may be configured to request or query the data 76 stored in the communication device 125, and the communication device 125 may be configured to transmit such data 76 in response to the request or query.

In any event, it is possible to configure the communication device 125 and the transceivers 58 such that the data 76 maintained by the communication device 125 is automatically communicated to the intermediate terminal transceivers 58 after such transceivers 58 are installed at the intermediate terminal 54. Note that "installation" of a transceiver 58 generally refers to the process of placing the transceiver 58 at the intermediate terminal 54 and performing any necessary steps to enable the transceiver 58 to communicate via cable 32c and to communicate with the communication device 125 and/or network 18. Such steps may comprise interconnecting the transceiver 58 with one or more connections from the cable 32c and/or the communication device 125. However, it is possible for the communication between the device 125 and the transceiver 58 to be wireless, in which case no further steps, other than perhaps placing the transceiver 58 within a communication range of the device 125, may be necessary for enabling communication between the transceiver 58 and the device 125.

It should be noted that the entries of the tables 112 referred to above have been described as storing minimum power back-off values or maximum spectrally compatible transmit power values. However, in other embodiments, the entries may store other types of values indicative of how the transmission power level of the transceiver 58 is to be adjusted in order to achieve spectral compatibility.

Furthermore, it should be noted that the techniques described above for ensuring spectral compatibility between the intermediate terminal transceivers 58 and central office transceivers 28 are presented for illustrative purposes. Indeed, it should be apparent to one of ordinary skill in the art, upon reading this disclosure, that various other techniques may be employed to ensure spectral compatibility between the intermediate terminal transceivers 58 and the central office transceivers 25 based on an estimated distance between the intermediate terminal transceivers 58 and at least one customer transceiver 28.

It should be further noted that some of the functionality described hereinabove as being performed by the transceiver manager 66 may be performed by logic (not specifically shown) external to the intermediate terminal transceiver 58, if desired. For example, the customer transceiver 28 in communication with the transceiver 58 may be configured to estimate the approximate distance "D" between the transceivers 28 and 58. After estimating the distance "D," the customer transceiver 28 may transmit, to the intermediate terminal transceiver 58, data indicative of the estimated distance "D." Further, if desired, the customer transceiver 28 may be configured to determine the proper amount of power back-off for the transceiver 58 and to transmit data indicative of this back-off amount to the transceiver 58. Thus, the customer transceiver 28, rather than the intermediate terminal transceiver 58, may estimate the distance "D" and/or determine the amount of power back-off to be implemented by the transceiver 58. Various other functionality may be performed by the customer transceiver 28 as well.

Operation

An exemplary use and operation of the communication system 50 and associated methodology are described hereafter.

For illustrative purposes, assume that the transceiver 58 shown by FIG. 3 is an asymmetric digital subscriber line (ADSL) transceiver configured to comply with T1.417. Further assume that the default transmission level of the transceiver 58 of FIG. 3 complies with ITU Standard G.992.1.

Furthermore, assume that the transmission power data 74 stored within the transceiver 58 comprises a table storing a plurality of minimum power back-off values. Each such value is preferably stored within an entry along with key data indicative of a unique combination of "B" and "C" distances. Moreover, each of the minimum power back-off values preferably represents the approximate minimum amount that the default transmission power level of transceiver 58 is to be reduced in order for the transceiver 58 to be spectrally compatible, as defined by T1.417, if it is assumed that the distance "A" equals zero.

Figure 8:
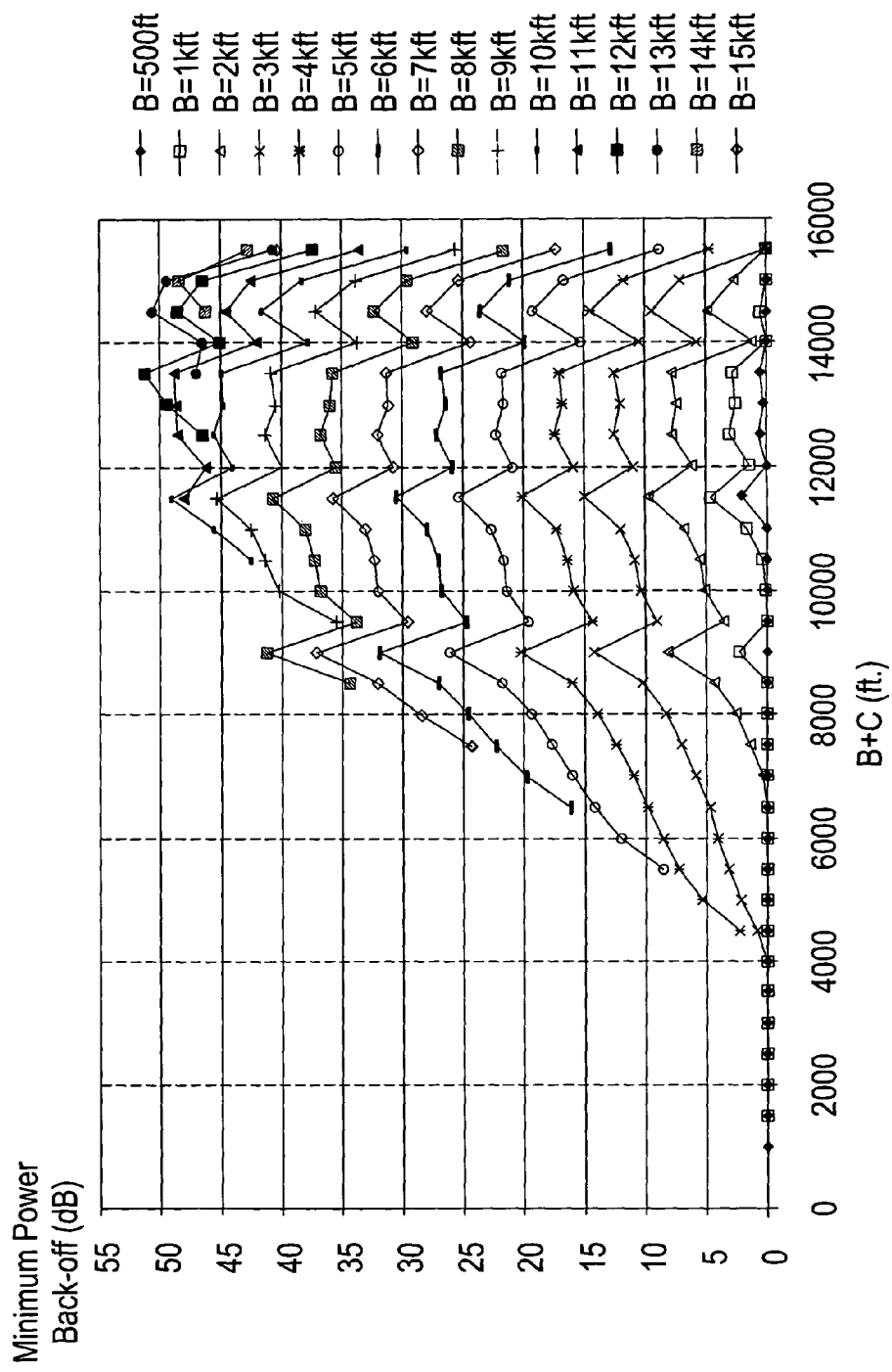
FIG. 8 is a graph depicting curves derived from the data depicted by FIG. 7.

FIGS. 7A-7G depict an exemplary table 132, as described above. Note that FIG. 8 depicts a graphical illustration of the data contained in the table 132. In this regard, each of the entries of the table 132 forms a data point plotted in the graph depicted by FIG. 8, and the data points derived from entries having data indicative of the same value for "B" are interconnected in FIG. 8.

Figure 9:
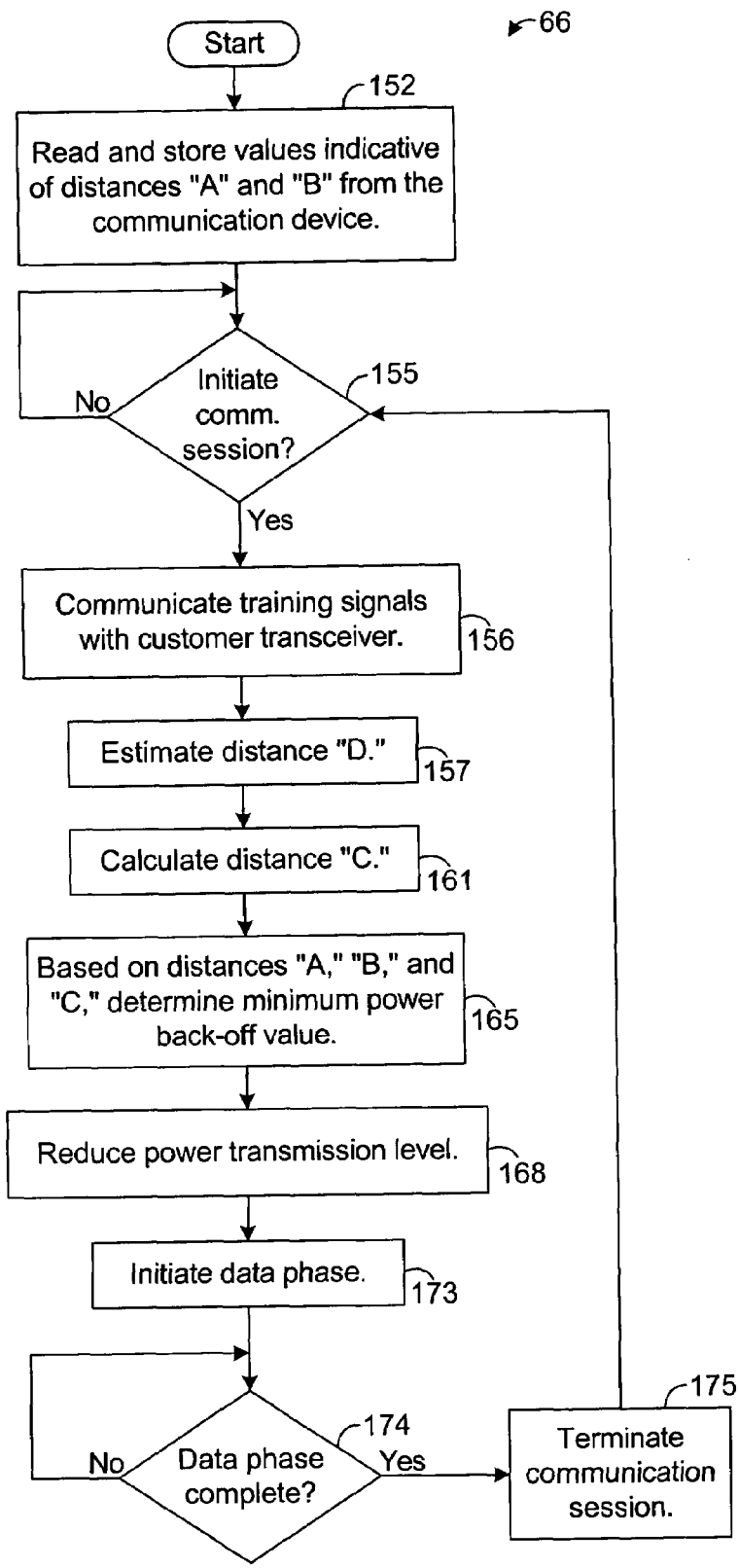
FIG. 9 is a flow chart illustrating an exemplary architecture and functionality of a transceiver manager, such as is depicted in FIG. 3.

The communication device 125 preferably stores data 76 that indicates the distances "A" and "B," and once the transceiver 58 is installed at the intermediate terminal 54, the transceiver manager 66 preferably reads and stores, within memory 71, the foregoing data 76, as shown by block 152 of FIG. 9. At some point, a communication session is initiated between the intermediate terminal transceiver 58 and a customer transceiver 28. When this occurs the transceivers 28 and 58 enter into a training phase that is followed by a subsequent data phase. During the training phase, training signals are communicated between the transceivers 28 and 58, and based on these training signals, the transceiver manager 66 of transceiver 58 estimates the distance "D" between the two transceivers 28 and 58, as shown by blocks 155-157 of FIG. 9. Note that during this training phase, the transceiver 58 preferably transmits signals at the default power level.

By subtracting the distance "A," as defined by the data 76 from the communication device 125, from the estimated distance "D," a value indicative of the distance "C" is calculated by the transceiver manager 66 in block 161. The values "A," "B," and "C" are then utilized by the transceiver manager 66 to determine a minimum power back-off value in block 165. In this regard, utilizing the values "B" and "B+C" as keys, the transceiver manager 66 looks-up or otherwise determines a minimum power back-off value from the table 132. This value preferably represents the approximate minimum amount that the transmission power of the transceiver 58 is to be reduced to ensure spectral compatibility, if it is assumed that "A" equals zero (i.e., if it is assumed that the transceiver 58 is residing at or close to the FDI 33). As previously described above, the transceiver manager 66 may perform interpolation or other similar techniques for determining the minimum power back-off value if one of the entries does not precisely correspond to the "B" and "B+C" values estimated by or provided to the transceiver 58.

After retrieving the minimum power back-off value, the transceiver manager 66 preferably reduces, based on the distance "A," the retrieved minimum power back-off value in order to generate a new minimum power back-off value. The amount of reduction preferably corresponds to an amount of attenuation that signals transmitted by the transceiver 58 experience between the intermediate terminal 54 and the FDI 33. Thus, the new minimum power back-off value preferably represents the approximate minimum amount that the transmission power of the transceiver 58 is to be reduced from the default power level to ensure spectral compatibility with the signals transmitted from the central office transceivers 25.

In block 168, the transceiver manager 66 reduces the transmission power level of the transceiver 58 by an amount corresponding to the new minimum power back-off value determined in block 165. Therefore, each signal transmitted by the transceiver 58 subsequent to block 168 is preferably transmitted at the reduced power level rather than at the default power level, thereby ensuring that the signals subsequently transmitted by the transceiver 58 in the data phase of the communication session are spectrally compatible. In this regard, by transmitting signals at the reduced power level, the transceiver 58 ensures that crosstalk induced by such signals do not cause the signal-to-noise ratios of signals transmitted from the central office 22 to fall below a specified level.

As shown by blocks 173-175, the data phase of the communication session is preferably initiated once the transmission power level has been adjusted via block 168, and the current communication session between the transceivers 28 and 58 is terminated upon completion of the data phase. After terminating the current communication session, the transceiver 58 may establish a new communication session with a different customer transceiver 28 and repeat the aforedescribed process of adjusting the transmission power level of the transceiver 58 based, in part, on an estimated distance between the transceiver 58 and the new customer transceiver 28. Moreover, by implementing the aforedescribed techniques, the transceiver manager 66 ensures that the signals transmitted by the intermediate terminal transceiver 58 are spectrally compatible during at least the data phase of each communication session associated with the transceiver 58.

It should be noted that estimating the distance of the data path between an intermediate terminal transceiver 28 and its corresponding customer transceiver 28 and/or calculating the distance "C" are not necessary features of the present invention. In this regard, the transceiver manager 66 of an intermediate terminal transceiver 58 may be configured to adjust the transmission power level of the transceiver 58 based on the distances "A" and "B."

As an example, referring to FIG. 8, each curve represents the minimum power back-off for ensuring spectral compatibility for different values of "C." If desired, a single point of a curve may be utilized for all possible values of "C." As an example, the maximum value of a curve depicted by FIG. 8 may be utilized for all values of "C." Thus, it is not necessary for the actual distance "C" to be determined. In such an embodiment, each distance "B" is associated, via the transmission power data 74, with a single minimum power back-off value.

Moreover, after determining the actual distance "B" from the transceiver distance data 76, the transceiver manager 66 may be configured to retrieve the associated minimum power back-off value and utilize this value according to the techniques described hereinabove in order to adjust the transmission power level of its transceiver 58. Note that interpolation may be performed if the actual distance "B" does not precisely correspond to one of the entries of the transmission power data 74.

In addition, utilization of curve maximums, as described above, ensures that spectral compatibility is achieved regardless of the actual distance "C." However, for some distances "C," spectral compatibility may be achieved with lower power back-off values. In such embodiments, utilization of the maximum power back-off value results in a transmission power level for the intermediate terminal transceiver 58 that is lower than what is required to achieve spectral compatibility. Thus, if desired, each distance "B" may be associated with a power back-off value that is lower than the maximum. However, in such embodiments, spectral compatibility for all possible distances "C" may not be ensured.

Furthermore, similar techniques may be employed in embodiments where maximum spectrally compatible power values are utilized in lieu of minimum power back-off values. In this regard, rather than defining multiple maximum spectrally compatible power values for each different value of "B," the power transmission data 74 may define a single maximum spectrally compatible power value for each different value of "B." Thus, it is not necessary to determine the distance "C." In such an embodiment, spectral compatibility may be ensured by selecting the lowest power value that achieves spectral compatibility for all possible distances "C."

It should be noted that it is possible to approximate the curves defined by the maximum spectrally compatible power values or power back-off values described above in order to reduce that amount of data necessary to define the power transmission data 74. For example, it may be possible to generate equations defining the curves depicted by FIG. 8, and such equations may be stored as the transmission power data 74. In such an example, it is not necessary to store the data point values of the curves depicted by FIG. 8. Instead, equations representing the curves of FIG. 8 may be stored, and the transceiver manager 66 may be configured to calculate the appropriate minimum power back-off value by evaluating the appropriate equation (i.e., the equation representing the curve associated with the distance "B+C").

Figure 10:
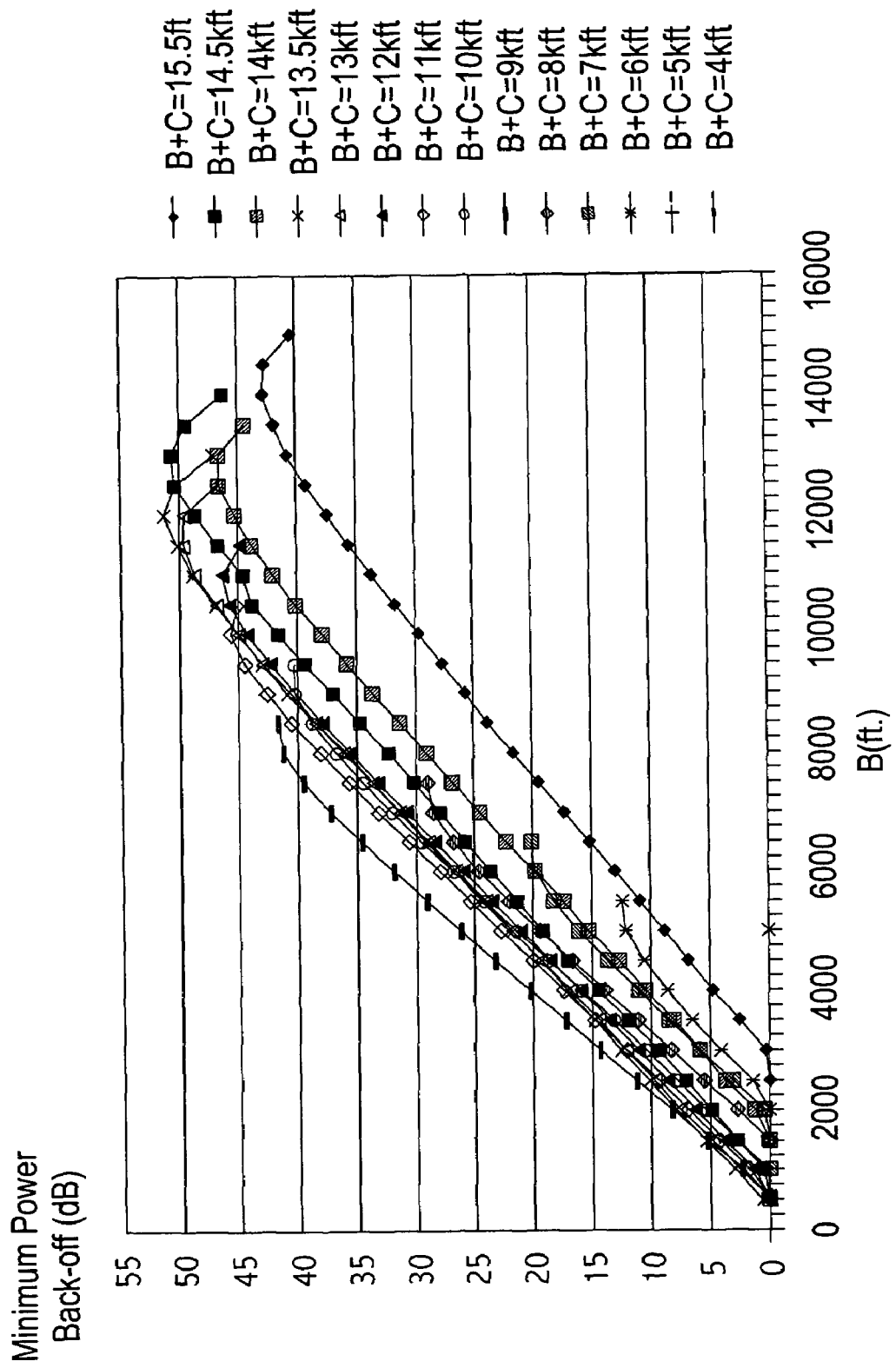
FIG. 10 is a graph depicting exemplary minimum power back-off curves derived from the data depicted by FIG. 7.

To facilitate the process of determining suitable equations for the power back-off values and/or for maximum spectrally compatible power values, it may be desirable to change the axes used to represent such values. As an example, FIG. 8 depicts curves representing the minimum power back-off values for different distances "B+C" where each of the curves corresponds to a different "B" value. However, if the representation of the graph is changed such that the horizontal axis represents "B" and each curve corresponds to a different "B+C" value, then different shaped curves for the graph are generated. In this regard, by changing the axes, as described above, the graph depicted by FIG. 8 may be transformed into the graph depicted by FIG. 10. As can be seen by comparing FIGS. 8 and 10, the curves of FIG. 10 appear more linear, and it, therefore, may be easier to generate or approximate equations defining the linearized curves of FIG. 10.

It should be further noted that the present invention has been described above as adjusting the transmission power levels of intermediate terminal transceivers 58 in order to ensure that crosstalk induced by the intermediate terminal transceivers 58 does not cause the signal-to-noise ratios of the signals transmitted by central office transceivers 25 to fall below specified levels. However, the aforedescribed techniques for adjusting the transmission power levels may employed for transceivers installed at locations other than an intermediate terminal.

It should be further emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

The invention claimed is:

1. A communication system, comprising:
a central office transceiver;
an intermediate terminal transceiver;
a feeder distribution interface coupled to the central office transceiver and the intermediate terminal transceiver;
a first customer transceiver residing at a first customer premises and coupled through the feeder distribution interface to the central office transceiver;
a second customer transceiver residing at a second customer premises and coupled through the feeder distribution interface to the intermediate terminal transceiver;
memory for storing data based on an estimated distance between the central office transceiver and the feeder distribution interface and an estimated distance between the intermediate terminal transceiver and the feeder distribution interface; and
logic configured to estimate a distance of a data path between the intermediate terminal transceiver and the second customer transceiver based on a signal transmitted via the data path, the logic further configured to control, based on the data and the estimated distance of the data path, a power output of the intermediate terminal transceiver for a signal transmitted by the intermediate terminal transceiver through the feeder distribution interface to the second customer transceiver thereby ensuring that the signal transmitted by the intermediate terminal transceiver is spectrally compatible with at least one signal transmitted by the central office transceiver through the feeder distribution interface to the first customer transceiver.

2. The system of claim 1, wherein the logic resides within the intermediate terminal transceiver.

3. The system of claim 1, wherein the logic is configured to adjust the power output equally across a range of frequencies.

4. The system of claim 1, wherein the logic is configured to adjust the power output of the intermediate terminal transceiver differently for different frequencies.

5. The system of claim 1, further comprising a communication device configured to automatically provide the intermediate terminal transceiver with at least a portion of the data, the portion indicative of the estimated distance between the intermediate terminal transceiver and the feeder distribution interface.

6. The system of claim 5, wherein the communication device is further configured to automatically provide the intermediate terminal transceiver with a portion of the data indicative of the estimated distance between the central office transceiver and the feeder distribution interface.

7. A data communication system having a central office transceiver residing at a central office and an intermediate terminal transceiver residing at an intermediate terminal, the central office and intermediate terminal transceivers coupled through a feeder distribution interface to customer transceivers, comprising:
means for determining a distance between the intermediate terminal transceiver and the feeder distribution interface and a distance between the central office transceiver and the feeder distribution interface;
means for automatically determining a distance between the intermediate terminal transceiver and one of the customer transceivers based on a signal communicated between the intermediate terminal transceiver and the one customer transceiver, the one customer transceiver residing at a customer premises; and
means for selecting a transmission power level of the intermediate terminal transceiver based on each of the distances and for controlling the intermediate terminal transceiver such that the intermediate terminal transceiver transmits a signal at the selected power level.

8. The system of claim 7, further comprising a means for automatically providing each of a plurality of intermediate terminal transceivers residing at the intermediate terminal with values indicative of an approximate distance between the central office and the feeder distribution interface and of an approximate distance between the intermediate terminal and the feeder distribution interface.

9. A system for communicating between transceivers, comprising:
a first transmitter configured to transmit signals to a first customer transceiver over a first communication connection that is bound within a binder, the first customer transceiver residing at a first customer premises; and
logic configured to estimate a distance of a data path between the first transmitter and the first customer transceiver based on at least one signal communicated over the data path, the logic further configured to control a transmission power level of the first transmitter for a signal transmitted by the first transmitter to the first customer transceiver based on the estimated distance, a distance between the first transmitter and a feeder distribution interface, and a distance between a second transmitter and the feeder distribution interface thereby ensuring that signals transmitted by the first transmitter to the first customer transceiver are spectrally compatible with signals transmitted from the second transmitter to a second customer transceiver over a second communication connection that is bound within the binder, the second customer transceiver residing at a second customer premises.

10. The system of claim 9, wherein the logic is configured to adjust the transmission power level equally for a range of frequencies.

11. The system of claim 9, wherein the logic is configured to adjust the transmission power level differently for different frequencies.

12. The system of claim 9, wherein the logic is configured to retrieve, from a look-up table and based on the estimated distance of the data path, a data value indicative of a transmission power level for the first transmitter, the logic further configured to cause the first transmitter to transmit at least one signal having the indicated power level based on the retrieved data value.

13. The system of claim 9, further comprising a receiver configured to receive at least one signal transmitted from the first customer transceiver over the data path, wherein the logic is configured to estimate the distance of the data path based on the at least one received signal.

14. The system of claim 9, wherein the first and second communication connections are coupled to the feeder distribution interface, and wherein the logic and the first transmitter reside within a transceiver installed at an intermediate terminal.

15. The system of claim 14, wherein the system further comprises a communication device that is configured to provide, to the logic, at least a portion of the data, the portion indicative of the estimated distance between the first transmitter and the feeder distribution interface, and wherein the logic is further configured to determine a transmission power level for the first transmitter based on the data and the estimated distance of the data path.

16. A communication method, comprising the steps of:
establishing a communication session between a first transceiver and a second transceiver, the first transceiver residing at a first premises and the second transceiver residing at a second premises;
communicating, during a training phase of the communication session, at least one signal between the first and second transceivers over a first communication connection that is bound via a binder, the communicating step comprising the step of transmitting at least one signal from the first transceiver at a default power level;
estimating a distance of a data path between the first and second transceivers based on at least one signal communicated in the communicating step;
controlling a transmission power level for the first transceiver based on the estimated distance of the data path, an estimated distance between the first transceiver and a feeder distribution interface, and an estimated distance between the feeder distribution interface and a third transceiver, such that signals transmitted by the first transceiver over the data path at the adjusted transmission power level are spectrally compatible with signals transmitted by the third transceiver to a fourth transceiver over a second communication connection that is bound by the binder, the third transceiver residing at a third premises and the fourth transceiver residing at a fourth premises; and
transmitting at least one signal from the first transceiver during a data phase of the communication session.

17. The method of claim 16, wherein the controlling step comprises the step of adjusting the transmission power level equally across a range of frequencies.

18. The method of claim 16, wherein the controlling step comprises the step of adjusting the transmission power level differently for different frequencies.

19. The method of claim 16, wherein the first and second communication connections are coupled to the feeder distribution interface, and wherein the method further comprises the steps of:
installing the first transceiver;
automatically providing, upon the installing step, the first transceiver with data indicative of the estimated distance between the first transceiver and the feeder distribution interface,
wherein the determining step is further based on the data.

20. A method for providing spectrum management in a data communication system having central office transceivers and intermediate terminal transceivers coupled through a feeder distribution interface to customer transceivers, the method comprising the steps of:
determining a first distance between one of the central office transceivers and the feeder distribution interface, the one central office transceiver residing at a central office;
determining a second distance between one of the intermediate terminal transceivers and the feeder distribution interface, the one intermediate terminal residing at an intermediate terminal;
automatically determining a third distance between the one intermediate terminal transceiver and one of the customer transceivers, the one customer transceiver residing at a customer premises; and
ensuring spectral compatibility between signals transmitted by the one intermediate terminal transceiver and signals transmitted by the one central office transceiver, the ensuring step comprising the step of automatically controlling, based on each of the determined distances, a transmission power of the one intermediate terminal transceiver.

21. The method of claim 20, further comprising the step of:
establishing a communication session between the one intermediate terminal transceiver and the one customer transceiver,
wherein the automatically determining step comprises the step of estimating, based on a signal communicated between the one intermediate terminal transceiver and the one customer transceiver during the communication session, an approximate distance between the one intermediate terminal transceiver and the one customer transceiver.

22. A method of ensuring spectral compatibility in a data communication system having a central office transceiver and an intermediate terminal transceiver coupled through a feeder distribution interface to a customer transceiver, the method comprising the steps of:
providing a table of power back-off values for adjusting transmission power levels of the intermediate terminal transceiver in order to ensure spectral compatibility between signals transmitted by the intermediate terminal transceiver and signals transmitted by the central office transceiver;
automatically determining a distance between the intermediate terminal transceiver and the customer transceiver based on signals communicated between the intermediate terminal transceiver and the customer transceiver;
selecting one of the power back-off values for the intermediate terminal transceiver based on the determined distance, a distance between the intermediate terminal transceiver and the feeder distribution interface, and a distance between the central office transceiver and the feeder distribution interface; and
controlling, based on the selected power back-off value, the transmission power level of the intermediate terminal transceiver.

23. A method for reducing crosstalk in a data communication system having a central office transceiver residing at a central office and an intermediate terminal transceiver residing at an intermediate terminal, the central office transceiver coupled through a feeder distribution interface to a first customer transceiver residing at a first customer premises and the intermediate terminal transceiver coupled through a feeder distribution interface to a second customer transceiver residing at a second customer premises, the method comprising the steps of:
storing a value indicative of an approximate distance between the central office and the feeder distribution interface and a value indicative of an approximate distance between the intermediate terminal and the feeder distribution interface;
automatically determining a value indicative of an approximate distance between the intermediate terminal transceiver and the second customer transceiver;
selecting a transmission power level of the intermediate terminal transceiver based on each of the values; and
transmitting a signal from the intermediate terminal transceiver at the selected transmission power level.

24. The method of claim 23, further comprising the step of:
automatically providing the intermediate terminal transceiver, upon installation of the intermediate terminal transceiver at the intermediate terminal, the value indicative of the approximate distance between the central office and the feeder distribution interface and the value indicative of the approximate distance between the intermediate terminal and the feeder distribution interface.

25. A communication method, comprising the steps of:
transmitting a signal from an intermediate terminal transceiver through a cable to a first customer transceiver residing at a first customer premises, the cable coupled to a feeder distribution interface that is coupled to the intermediate terminal transceiver and a central office transceiver, the cable propagating at least one signal transmitted from the central office transceiver, the intermediate terminal transceiver residing at an intermediate terminal and the central office transceiver residing at a central office;
ensuring spectral compatibility between signals transmitted by the intermediate terminal transceiver and signals transmitted by the central office transceiver to a second customer transceiver residing at a second customer premises, the ensuring step comprising the step of automatically controlling a power output of the intermediate terminal transceiver; and
estimating a distance between the intermediate terminal transceiver and the first customer transceiver based on at least one signal transmitted between the intermediate terminal transceiver and the first customer transceiver, wherein the controlling step is based on the estimated distance, a distance between the intermediate terminal transceiver and the feeder distribution interface, and a distance between the central office transceiver and the feeder distribution interface.

26. A communication method, comprising the steps of:
transmitting a signal from at least one intermediate terminal transceiver through a cable to a customer transceiver, the cable coupled to a feeder distribution interface that is coupled to the at least one intermediate terminal transceiver and at least one central office transceiver, the cable propagating at least one signal transmitted from the at least one central office transceiver;
automatically controlling a power output of the at least one intermediate terminal transceiver such that a specified performance margin of the at least one central office transceiver is maintained;
estimating a distance between the at least one intermediate terminal transceiver and the customer transceiver, wherein the adjusting is further based on the estimated distance;
plotting a graph having axes corresponding to distances between the transceivers and the feeder distribution interface, the graph having at least one curve indicative of a level to which the power output of the at least one intermediate terminal transceiver is to be set via the controlling step; and
linearizing the at least one curve,
wherein the controlling step is based on the at least one linearized curve.

27. The system of claim 1, wherein the logic is configured to determine a difference between the estimated distance of the data path and the estimated distance between the intermediate terminal transceiver and the feeder distribution interface, and wherein the logic is configured to control the power output based on the difference.

28. The method of claim 20, further comprising the step of determining a difference between the second distance and the third distance, wherein the controlling step is based on the difference.

29. The system of claim 1, wherein the first intermediate terminal transceiver is remote from the feeder distribution interface and the central office transceiver.

30. The system of claim 1, wherein the feeder distribution interface is coupled to the first and second customer transceivers via a first binder, wherein the signal transmitted by the intermediate terminal transceiver passes through the first binder, and wherein the at least one signal transmitted by the central office transceiver passes through the first binder.

31. The system of claim 30, wherein feeder distribution interface is coupled to the central office transceiver via a second binder, wherein the feeder distribution interface is coupled to the intermediate terminal transceiver via a third binder, wherein the signal transmitted by the intermediate terminal transceiver passes through the third binder but not the second binder, and wherein the at least one signal transmitted by the central office transceiver passes through the second binder but not the third binder.

* * * * *